Feb. 26, 1952 W. E. COLEMAN 2,587,118
POSITION FOLLOWING CONTROL
Filed Dec. 29, 1950

INVENTOR
WILLIAM E. COLEMAN
BY Donald G. Dalton
HIS ATTORNEYS

Patented Feb. 26, 1952

2,587,118

UNITED STATES PATENT OFFICE 2,587,118

POSITION FOLLOWING CONTROL

William E. Coleman, Pittsburgh, Pa., assignor to United States Steel Corporation, a corporation of New Jersey Application December 29, 1950, Serial No. 203,435

10 Claims. (Cl. 322—27)

This invention relates to a position following control and more particularly to a control for maintaining a constant current supply to a load. Controls of this general type are well known but in general they are either of the on and off type or if of the proportional type, the control is complicated and has moving parts which give frequent maintenance trouble.

It is an object of this invention to provide a proportional control for maintaining a constant current supply without the use of complicated mechanical linkages or moving contacts.

This and other objects will be more apparent after referring to the following specification and attached drawings, in which.

Figure 1:
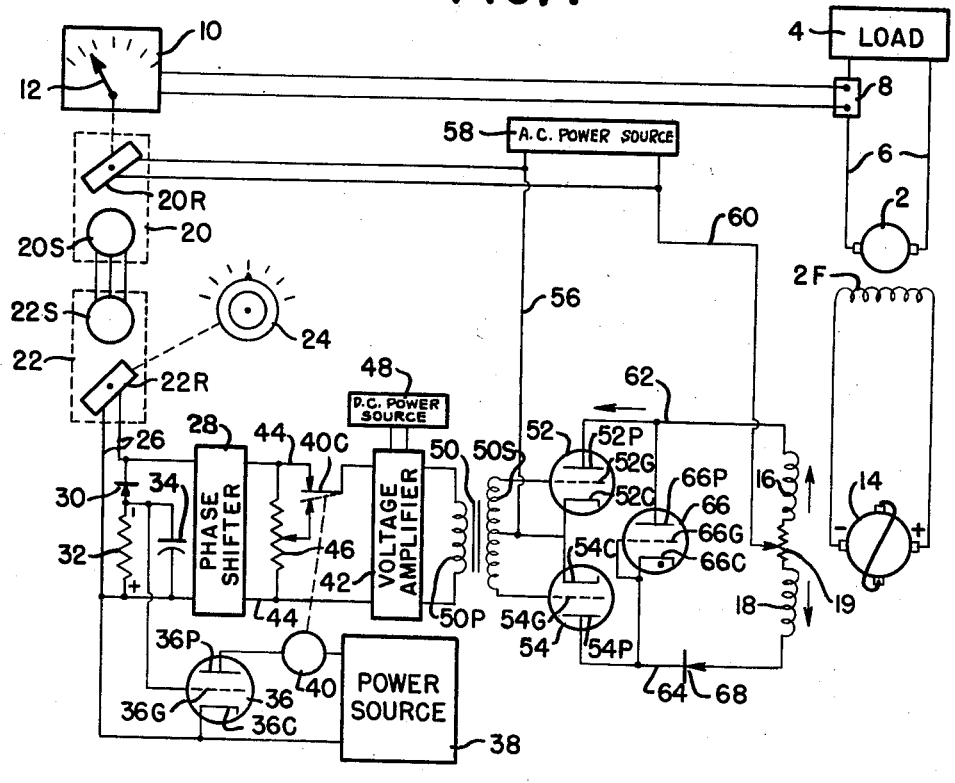
Figure 1 is a schematic view of a preferred embodiment of my invention.

Referring more particularly to the drawings, the reference numeral 2 indicates a generator for supplying current to a load 4 through the leads 6. A shunt 8 is provided in one of the leads 6 for obtaining a voltage proportional to the current flowing therethrough. The shunt 8 is connected to a self-balancing potentiometer 10 having a pointer arm 12. This potentiometer provides a means for obtaining an angular displacement proportional to the current supplied to the load. The generator 2 is provided with a field winding 2F which is connected to the output of an amplifying regulating exciter or generator 14. The amplifying regulating exciter 14 may be of the type manufactured by the General Electric Company and known as the "Amplidyne." The exciter 14 is provided with field windings 16 and 18 which control the output thereof. The two field windings 16 and 18 are connected by a variable resistance 19. Pointer arm 12 of potentiometer 10 is mechanically connected to the rotor 20R of a selsyn motor 20. The stator 20S of the selsyn motor 20 is electrically connected to the stator 22S of a second selsyn motor 22. The rotor 22R of the motor 22 is mechanically connected to a handwheel 24 which may be moved to vary the current supplied to the load 4 in a manner to be described hereinafter. The rotor 22R is connected by means of wires 26 to a phase shifter 28. A half-wave rectifier 30 and a resistance 32 are connected across the wires 26. A capacitor 34 is connected in parallel with the resistance 32. A tube 36 has its grid 36G connected between the half-wave rectifier 30 and resistance 32. The plate 36P and cathode 36C of the tube 36 are connected to a power source 38.

The tube 36 may be a gas tube in which case power source 38 is an A. C. power source or it may be a vacuum tube as shown, in which case the power source is a D. C. power source. The cathode 36C is also connected to one of the wires 26. A relay coil 40 is connected in the line leading from the power source 38 to the plate 36P. A phase shifter 28 is connected to a voltage amplifier 42 by means of the wires 44. The purpose of the phase shifter 28 is to cancel out the fixed phase shift produced in the circuit. A variable resistance 46 is connected across the wires 44. The relay 40 is provided with a contactor 40C which is movable from the full line position shown in Figure 1 when the relay coil is energized to the dotted line position when the relay coil is deenergized. The voltage amplifier 42 is connected to a D. C. power source 48. The output of amplifier 42 is connected to the primary 50P of a center tapped transformer 50. The secondary 50S of the transformer has its ends connected to the grids 52G and 54G of vacuum tubes 52 and 54, respectively. The center tap of the secondary 50S is connected by means of wire 56 to an A. C. power source 58 which also supplies power for the rotor 20R. The wire 56 is also connected to the cathodes 52C and 54C. A second wire 60 from the A. C. power source 58 is connected to the arm of the variable resistance 19. The field 16 is connected to the plate 52P by means of a wire 62 and the field 18 is connected to the plate 54P by means of a wire 64. A gas tube 66 may be connected across the wires 62 and 64 for a purpose which will appear later. The plate 66P of the tube 66 is connected to the wire 62 and the cathode 66C and grid 66G are connected to the wire 64. If desired, the grid 66G can be omitted. A half-wave rectifier 68 is connected in the line leading from the field 18 to the cathode 66C for a purpose which will be explained later. The arrangement of the selsyn motors 20 and 22 are such that a voltage is provided across the wires 26 except when the rotors 20R and 22R are in rotary alignment. This voltage is of one phase when the displacement angle is in one direction and in the opposite phase when the displacement angle is in the other direction. The value of the output voltage is a function of the angle between the two rotors. Since the selsyn rotor will have two positions 180° apart where a zero voltage will appear, the connection between the arm 12 and rotor 20R is such that the rotor will not turn more than 180° for a full scale swing of the arm 12.

The operation of the device is as follows:

The handwheel 24 is adjusted to give the desired output from the generator 2. This moves the rotor 22R, thus causing a voltage to be developed across lines 26 which is applied to the phase shifter 28 and which may be defined as an error voltage. When the generator 2 is first started, this error will be great and a relatively large voltage will result. Overloading of the generator 2 is prevented in the following manner. When the error signal across wires 26 exceeds a given amount the negative voltage from rectifier 30, which is impressed across resistance 32 and capacitor 34 and applied to the grid 36G of the tube 36, reduces the current through tube 36 to such an amount that the relay coil 40 will be deenergized, thus moving the contactor 40C to the dotted line position shown. This reduces the amplitude of the error signal to amplifier 42 because of the resistance 46, thus preventing or limiting overload. Capacitor 34 will smooth out ripples thus assuring proper functioning of the tube 36. When the error signal is reduced to a point where the negative voltage through tube 36 permits it to conduct sufficiently, coil 40 will be energized and the contactor 40C will move to its full line position, thus applying the full error voltage to the amplifier 42. The phase shifter 28 is adjusted to compensate for any undesired fixed phase shift in the overall system and is not absolutely necessary to the proper functioning or control, but provides more satisfactory operation especially when the fixed phase shift of the overall system is of any considerable amount. The voltage amplifier 42 may also be omitted but it is generally desirable to amplify the voltage signal in order to provide sufficient sensitivity for normal use. The signal is transmitted from amplifier 42 to the primary 50P of transformer 50 and through the secondary 50S to the grids 52G and 54G. The center tapped secondary 50S splits the phase so that the grids 52G and 54G are fed 180° out of phase. When there is no error signal the grids 52G and 54G are at the same potential and conduct approximately equal currents and as the fields 16 and 18 are connected to buck each other the exciter 14 will put out approximately zero voltage. With the error signal in the direction shown the impulse on grid 52G will be in phase with the A. C. power source 58 and the impulse on grid 54G will be out of phase with the A. C. power source 58. Thus the tube 52 will conduct during the positive half cycle of the impulse to a much greater degree than the tube 54 conducts. This causes current flow through field 16 to provide an output from exciter 14 of the polarity shown. The output applied to field 2F will increase the output of generator 2, thus changing the position of potentiometer arm 12 and the rotor 20R. This procedure will continue until the rotors 20R and 22R are in alignment. If for any reason the output of generator 2 becomes greater than that called for by position of handwheel 24, the rotor 22R will be displaced in the opposite direction so that the voltage output to lines 26 will be of the opposite phase. This will cause the tube 54 to conduct a greater amount than the tube 52 during the positive half cycle of the impulse, thus causing current flow through field 18 in a direction to decrease the output from exciter 14, thus decreasing the output of generator 2.

The purpose of resistance 19, tube 66 and rectifier 68 is to prevent reversal of polarity of the voltage output of exciter 14. Assuming that the current in field 16 flowing in the direction indicated by the arrow causes an output voltage of the polarity indicated from the exciter 14 and the current in the direction indicated in field 18 tends to cause a reverse polarity, there will be no output voltage from the exciter 14 as long as there is equal current flowing in both of the fields. As the current increases in field 16 and decreases in field 18, the output voltage of exciter 14 will increase and have the polarity shown. If the current then decreases in field 16 and increases in field 18, the output voltage of exciter 14 will decrease until the current in both fields is equal. If the current in field 18 exceeds that in field 16, the output of exciter 14 will be of the reverse polarity to that shown if the tube 66 is omitted. However, when the currents of the two fields become approximately equal, the voltage at the plates 52P and 66P will exceed that of plate 54P because of the different voltage drops in the two fields. This will cause gas tube 66 to fire, thus maintaining the currents in fields 16 and 18 approximately equal. By adjusting the resistance 19 so that more of the resistance is in series with the field 16 than with the field 18 there may be a limited increase of the current in field 18 over that of field 16. The resistance 19 may be placed anywhere in the circuit comprising tube 66 and fields 16 and 18 except in the connection from lead 62 to plate 66P and from lead 64 to cathode 66C. The rectifier 68 prevents circulation of current through tube 66 as the result of the transformer action between fields 16 and 18. While it is not essential to the operation, it does prevent reverse current in the field 18 which may be undesirable under some conditions.

Figure 2:
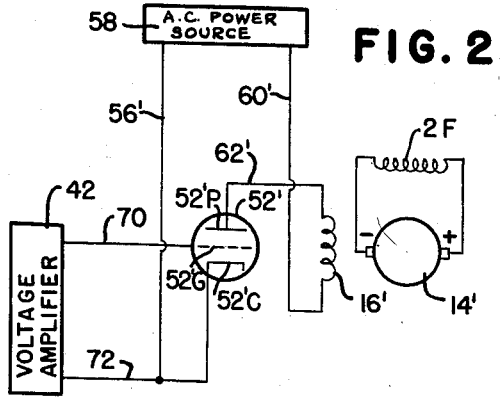
Figure 2 is a schematic diagram of a second embodiment of my invention.

Figure 2 shows a second embodiment of my invention in which only one tube 52' is utilized. In this embodiment, the impulse from amplifier 42 is impressed on the grid 52'G and on the cathode 52'C through the leads 70 and 72, respectively. The lead 56' is connected to the lead 72 as shown. The plate 52'P is connected to the field 16' of the exciter 14'. The field 18, resistance 19, tubes 54 and 66 and rectifier 68 are omitted and the circuit is otherwise the same as that of Figure 1.

The operation of the device is as follows:

When the output of generator 2 is less than that called for by the handwheel 24, an impulse is generated in such a direction that it will be in phase with the A. C. power source 58. This is applied to tube 52', thus causing tube 52' to conduct which increases the current flow through field 16' so as to increase the output of generator 14'. This will increase the output of generator 2 until the current is substantially that called for by handwheel 24. If the current becomes greater than that called for by handwheel 24, the impulse from rotor 22R will be of opposite phase so that the tube 52' will conduct less than normal and the current flow in field 16' will be less than normal, thus decreasing the output of exciter 14'.

While several embodiments of my invention have been shown and described, it will be apparent that other adaptations and modifications may be made without departing from the scope of the following claims.

I claim:

1. Apparatus for controlling the current supplied to a load comprising means for obtaining an angular displacement proportional to the current supplied to the load, two selsyn motors, each having a stator and rotor, an electrical connection between the two stators, a mechanical connection between the first of said rotors and said means, means for changing the position of the second rotor, an A. C. power source, means connecting said A. C. power source to said first rotor, an exciter for regulating the current supplied to the load, said exciter having a field winding, a vacuum tube having a plate, grid and cathode, two wires connected to said second rotor, a connection between one of said wires and the grid of said tube, a connection between the other of said wires and the cathode of said tube, a connection between said A. C. power source and said last named connection, a connection between said A. C. power source and one side of said field, and a connection between the other side of said field and the plate of said tube.

2. Apparatus for controlling the current supplied to a load according to claim 1, including a half-wave rectifier connected across said wires, a resistance in series with said rectifier, a capacitor connected in parallel with said resistance, a tube having a plate, cathode and grid, the grid of said last named tube being connected between said resistance and said rectifier, a connection between one of said wires and said last named cathode, a power source, a connection between said last named power source and said last named cathode, a connection between said last named power source and said last named plate, a relay coil in said last named connection, a variable resistance connected across said wires between said first named resistance and said first named tube, and an adjusting arm for said variable resistance, the contacts of said relay being movable from one position in which they complete a circuit through one of said wires to said first named grid to a second position in which they complete a circuit through said last named arm to said first named grid.

3. Apparatus for controlling the current supplied to a load comprising means for obtaining an angular displacement proportional to the current supplied to the load, two selsyn motors, each having a stator and rotor, an electrical connection between the two stators, a mechanical connection between the first of said rotors and said means, means for changing the position of the second rotor, an A. C. power source, means connecting said A. C. power source to said first rotor, two wires connected to said second rotor, an exciter for regulating the current supplied to the load, said exciter having a pair of connected field windings, a pair of vacuum tubes each having a plate, grid and cathode, a center tapped transformer having its primary winding connected to said wires, a connection between the center tap of the secondary winding of said transformer and the cathodes of said tubes, a connection between said A. C. power source and said last named connection, a connection between one end of said secondary winding and the grid of the first of said tubes, a connection between the other end of said secondary winding and the grid of the second of said tubes, a connection between said A. C. power source and the connection between said fields, a connection between one of said fields and the plate of the first tube, and a connection between the other of said fields and the plate of the second tube.

4. Apparatus for controlling the current supplied to a load according to claim 3, including a half-wave rectifier connected across said wires, a resistance in series with said rectifier, a capacitor connected in parallel with said resistance, a tube having a plate, cathode and grid, the grid of said last named tube being connected between said resistance and said rectifier, a connection between one of said wires and said last named cathode, a power source, a connection between said last named power source and said last named cathode, a connection between said last named power source and said last named plate, a relay coil in said last named connection, a variable resistance connected across said wires between said first named resistance and said primary winding, an adjusting arm for said variable resistance, the contacts of said relay being movable from one position in which they complete a circuit through one of said wires to said primary winding to a second position in which they complete a circuit through said last named arm to said primary winding and a phase shifter connected across said wires.

5. Apparatus for controlling the current supplied to a load comprising means for obtaining an angular displacement proportional to the current supplied to the load, two selsyn motors each having a stator and rotor, an electrical connection between the two stators, a mechanical connection between the first of said rotors and said means, means for changing the position of the second rotor, an A. C. power source, means connecting said A. C. power source to said first rotor, two wires connected to said second rotor, an exciter for regulating the current supplied to the load, said exciter having a pair of connected field windings, a pair of vacuum tubes each having a plate, grid and cathode, a center tapped transformer having its primary winding connected to said wires, a connection between the center tap of the secondary winding of said transformer and the cathodes of said tubes, a connection between said A. C. power source and said last named connection, a connection between one end of said secondary winding and the grid of the first of said tubes, a connection between the other end of said secondary winding and the grid of the second of said tubes, a connection between said A. C. power source and the connection between said fields, a connection between one of said fields and the plate of the first tube, a connection between the other of said fields and the plate of the second tube, a gas tube having a cathode and plate, a branch connection between the plate of said gas tube and the connection to the plate of said first tube, a branch connection between the cathode of said gas tube and the connection to the plate of said second tube, a circuit including said fields, said branch connections and said gas tube, and a resistance in said circuit in series with said fields and said branch connections.

6. Apparatus for controlling the current supplied to a load according to claim 5 having a half-wave rectifier in said circuit.

7. Apparatus for controlling the current supplied to a load according to claim 5, including a half-wave rectifier connected across said wires, a resistance in series with said rectifier, a capacitor connected in parallel with said resistance, a tube having a plate, cathode and grid, the grid of said last named tube being connected between said resistance and said rectifier, a connection between one of said wires and said last named cathode, a power source, a connection between said last named power source and said last named cathode, a connection between said last named power source and said last named plate, a relay coil in said last named connection, a variable resistance connected across said wires between said first named resistance and said primary winding, an adjusting arm for said variable resistance, the contacts of said relay being movable from one position in which they complete a circuit through one of said wires to said primary winding to a second position in which they complete a circuit through said last named arm to said primary winding and a phase shifter connected across said wires.

8. Apparatus for controlling the current supplied to a load comprising means for obtaining an angular displacement proportional to the current supplied to the load, two selsyn motors each having a stator and rotor, an electrical connection between the two stators, a mechanical connection between the first of said rotors and said means, means for changing the position of the second rotor, a pair of wires connected to said second rotor, an A. C. power source, means connecting said A. C. power source to said first rotor, an exciter for regulating the current supplied to the load, said exciter having a pair of connected field windings, a pair of vacuum tubes each having a plate, grid and cathode, a center tapped transformer having its primary winding connected to said wires, a phase shifter connected across said wires, a connection between the center tap of the secondary winding of said transformer and the cathodes of said tubes, a connection between said A. C. power source and said last named connection, a connection between one end of said secondary winding and the grid of the first of said tubes, a connection between said A. C. power source and the connection between said fields, a connection between one of said fields and the plate of the first tube, and a connection between the other of said fields and the plate of the second tube.

9. Apparatus for controlling the current supplied to a load according to claim 8, including a gas tube having a cathode and plate, a branch connection between the plate of said gas tube and the connection to the plate of said first tube, a branch connection between the cathode of said gas tube and the connection to the plate of said second tube, a circuit including said fields, said branch connections and said gas tube, and a resistance in said circuit in series with said fields and said branch connections.

10. Apparatus for controlling the current supplied to a load according to claim 8, including a half-wave rectifier connected across said wires, a resistance in series with said rectifier, a capacitor connected in parallel with said resistance, a tube having a plate, cathode and grid, the grid of said last named tube being connected between said resistance and said rectifier, a connection between one of said wires and said last named cathode, a power source, a connection between said last named power source and said last named cathode, a connection between said last named power source and said last named plate, a relay coil in said last named connection, a variable resistance connected across said wires between said first named resistance and said primary winding, an adjusting arm for said variable resistance, the contacts of said relay being movable from one position in which they complete a circuit through one of said wires to said primary winding to a second position in which they complete a circuit through said last named arm to said primary winding and a phase shifter connected across said wires.

WILLIAM E. COLEMAN.

REFERENCES CITED

The following references are of record in the file of this patent:

UNITED STATES PATENTS

| Number | Name | Date |
|---|---|---|
| 2,393,622 | Adams et al. | Jan. 29, 1946 |